(12) United States Patent
Pandey et al.

(10) Patent No.: US 7,700,144 B2
(45) Date of Patent: Apr. 20, 2010

(54) PROCESS FOR PREPARING AN AERATED FOOD PRODUCT COMPRISING PROTEIN AND FIBER (75) Inventors: Pramod Kumar Pandey, Lachine (CA); Julia Maria Guerrero, Lachine (CA); Margaret Ciaston, Irwindale (CA)

(73) Assignee: Nellson Nutraceutical LLC, Irwindale, CA (US)

(*) Notice: Subject to any disclaimer, the term of this patent is extended or adjusted under 35 U.S.C. 154(b) by 0 days.

(21) Appl. No.: 12/418,308

(22) Filed: Apr. 3, 2009

(65) Prior Publication Data

US 2009/0181145 A1  Jul. 16, 2009

Related U.S. Application Data (63) Continuation-in-part of application No. 11/488,819, filed on Jul. 19, 2006.

(60) Provisional application No. 60/700,326, filed on Jul. 19, 2005.

(51) Int. Cl.
*A23L 1/00* (2006.01)
*A23C 3/037* (2006.01)

(52) U.S. Cl. ..................... 426/564; 426/474

(58) Field of Classification Search .......... 426/474, 426/519, 564, 571
See application file for complete search history.

(56) References Cited

U.S. PATENT DOCUMENTS

| 2,600,569 | A |   | 6/1952  | Oakes |
| 2,692,201 | A | * | 10/1954 | Conrad et al. ............ 426/571 |
| 4,018,900 | A |   | 4/1977  | Hayward |
| 4,018,901 | A |   | 4/1977  | Hayward |
| 4,038,423 | A |   | 7/1977  | Hayward |
| 4,049,832 | A |   | 9/1977  | Hayward |
| 4,145,448 | A |   | 3/1979  | Hayward |
| 4,152,462 | A |   | 5/1979  | Hayward |
| 4,714,620 | A |   | 12/1987 | Bunick |
| 4,911,937 | A | * | 3/1990  | Crosello et al. ............ 426/103 |
| 5,098,730 | A | * | 3/1992  | Pepper et al. ............ 426/548 |
| 5,429,830 | A | * | 7/1995  | Janovsky et al. ............ 426/94 |
| 5,478,588 | A |   | 12/1995 | Talignani |
| 6,207,216 | B1 |  | 3/2001  | Zietlow |
| 6,376,003 | B1 |  | 4/2002  | Cross |
| 6,432,460 | B1 |  | 8/2002  | Zietlow |
| 6,471,394 | B2 | * | 10/2002 | Kesig ........................ 366/331 |
| 6,793,953 | B2 |  | 9/2004  | Zietlow |
| 2002/0187220 | A1 | * | 12/2002 | Luhadiya ................. 426/89 |
| 2002/0192345 | A1 |  | 12/2002 | Kepplinger |
| 2005/0013923 | A1 |  | 1/2005  | Shimek |
| 2005/0089619 | A1 | * | 4/2005  | Haynes et al. ............ 426/571 |
| 2005/0214429 | A1 |  | 9/2005  | Anderson |
| 2006/0062883 | A1 |  | 3/2006  | Hanselmann |
| 2007/0178209 | A1 |  | 8/2007  | Bialek |
| 2008/0102165 | A1 |  | 5/2008  | Ning |

FOREIGN PATENT DOCUMENTS

WO   WO 2008/046742   4/2008

OTHER PUBLICATIONS

Minifie, Chiocolate Cocoa and Confectionery: Science and Technology,Third Edition, 1989, Chapman and Hall Publication, pp. 567-573, total pp. 9.*
Igoe, Robert S.; Hui, Y. H. Dictionary of Food Ingredients (4th Edition). (pp. 24, 86, 130-131, 135-136 and 153-154)). Springer-Verlag.*
Canadian Intellectual Property Office Action dated Nov. 18, 2008, in related Canadian Application No. 2,552,313.

* cited by examiner

*Primary Examiner*—Keith D Hendricks
*Assistant Examiner*—Jyoti Chawla
(74) *Attorney, Agent, or Firm*—Arent Fox LLP (57) ABSTRACT

A process of making an aerated food product comprising protein and fiber is described.

14 Claims, 1 Drawing Sheet

Fig. 1

PROCESS FOR PREPARING AN AERATED FOOD PRODUCT COMPRISING PROTEIN AND FIBER

CROSS-REFERENCE TO RELATED APPLICATIONS

The present application is a continuation-in-part application of U.S. patent application Ser. No. 11/488,819 filed Jul. 19, 2006, which claims priority to U.S. provisional application 60/700,326 filed Jul. 19, 2005, the contents of which are incorporated in their entirety.

FIELD OF THE INVENTION

The present invention relates to a process for making an aerated food product comprising protein and fiber and having a density and a moisture index such that the compositions have pleasant organoleptic/texture properties.

BACKGROUND OF THE INVENTION

Aerated compositions, such as marshmallows are known in the art. While there are many types of marshmallows on the market, their methods of preparation generally fall into two main process groups: extruded marshmallow and deposited marshmallow. In both groups, the marshmallow is made up of two main ingredients: a sugar-based syrup and a structuring agent, usually albumin, agar or gelatin. Typically, the sugar-based syrup is heated to reduce its water content and is thereafter cooled down. It is then combined with the structuring agent to form a slurry. The slurry is further aerated to form a foam. Optionally, colors and flavors can be added to the foam. Once the foam is produced, it can be shaped by an extrusion process or a deposition process. In the extrusion process, the foam is extruded through a die to form a rope. The die imparts the desired peripheral shape to the extruded rope. The rope is allowed to rest briefly to set, and then is cut into desired sizes. In the deposition process, the foam is deposited and allowed to rest briefly before shaping. Optionally, the extruded/deposited marshmallows can be dried (refer to U.S. Pat. No. 4,785,551 issued Nov. 2, 1988). Marshmallows may also contain edible coloring and other minor edible ingredients such as edible humectants. However, marshmallows are mostly sugar based confection and the protein and fiber content is usually very low.

Dried marshmallows, particularly in smaller or bit sizes, are commonly added to certain popular Ready-To-Eat ("RTE") breakfast cereals, particularly those marketed to children. Because of the process used for their preparation, proteins and peptides can be added only in limited amounts because they modify the organoleptic properties of the marshmallows. In fact, the presence of high amounts of proteins can adversely interfere with the desired characteristics of the aerated food composition by negatively affecting the taste, texture and density of the aerated food pieces.

Obesity in North America is mostly due to consumption of unhealthy foods such as product containing high sugar (carbohydrates) foods and beverages. The evolution of nutritional bars in the early nineties gave an alternative choice to health conscious consumers. However, due to its inability to meet the consumer expectations of taste and texture, the nutritional bar business is loosing its grounds among its quite large consumer base. Consumers are desperately looking for healthy food/snacks substitutes, which must be a healthy choice but, at the same time, have interesting organoleptic properties. Recent medical studies have indicated that a diet containing the recommended daily allowance (RDA) of nutritive ingredients such as fiber, proteins, peptides or amino acids, might be effective in preventing physiological diseases and also possibly improving the general health. Proteins and peptides are also of particular nutritional value in growing children to support the growth of different tissues and organs. Also, of particular value is the addition of fiber to the diet of all groups of people. Dietary fiber is known to prevent or relieve constipation but can provide other health benefits as well, including lowering the risk of diabetes and heart disease. Thus, there is great public interest in the consumption of food products that will supply the recommended daily allowance of such nutritive ingredients, particularly in a product that is convenient to eat and good tasting.

Patent literature is abundant with respect to the production of aerated compositions. U.S. Pat. No. 2,600,569 issued Jun. 17, 1952, discloses the general process ("Oakes-type") for the production of marshmallows mostly sugar-based as it is known today. In the Oakes-type process, a sugar syrup comprising other ingredients in small amounts such as gelatin, soy bean protein, egg white and water is forced through a super-pressurized path in which gas is introduced to aerate the product. U.S. Pat. No. 3,684,528 issued Aug. 15, 1972 discloses the inclusion of very low amount of non-fat dry milk solids (less than 5%) to a marshmallow.

U.S. Pat. No. 4,038,423 issued Jul. 26, 1977, discloses a marshmallow coated with fat and vitamins. The marshmallow described in this patent document may contain an elevated protein content, usually from skim milk powder. In order to prevent the proteins from hardening the marshmallow, the proteins have been denatured by lecithination. Briefly, the proteins have been treated with fats and incorporated in a coating for the marshmallow. Consequently, the proteins are included in the coating and are not dispersed in the marshmallow itself. However, such protein treatment may result in the reduction or loss of the biological value of the protein, the reduction or loss of the functional properties of the protein (e.g. such as the film forming ability of the protein) and ultimately, in the modification of the textural properties of the marshmallow (such as a modification in the density of the marshmallow) resulting in the lowering in the number and area of the air pockets in the composition. In addition, lecithination also introduces organoleptic problems and increases the fat content of the marshmallow. Further, lecithination prevents hardening of the marshmallow for a short period of time but eventually, the marshmallow composition hardens due to the presence of the proteins. In U.S. Pat. No. 4,038,423, a Bloom gelatin is used as a whipping/film forming agent. In addition, the marshmallow described therein is limited to an Oakes-type manufacturing process where air is forced in the marshmallow.

U.S. Pat. No. 6,749,886 issued on Jun. 15, 2004, U.S. Pat. No. 6,432,457 issued on Aug. 13, 2002, U.S. Pat. No. 6,299,929 issued on Oct. 9, 2001, relate to confectionery having high a protein content. The confectioneries described therein do not relate to aerated compositions, have a high density and do not possess pleasant organoleptic properties.

Considering the state of the art described above, it remains highly desirable to develop a new aerated food composition containing protein and fiber and a process of making such composition.

SUMMARY OF THE INVENTION

The present invention is directed to a method of making a solid, non-frozen, aerated food product wherein a dough comprising protein and fiber is aerated. This method differs from prior art methods of making aerated products such as marshmallows. For instance, the process of the present invention does not introduce gas or a gassing gas agent for the aeration step. Also, in contrast to the Oakes-type prior art process, where all the ingredients are in liquid form when they are subjected to aeration, in the process of the present invention, both protein and fiber are in a semi-solid dough and this dough is aerated through a whipping process.

Specifically, the present invention is directed to a process for preparing an aerated food product comprising the steps of:
 a) preparing a liquid carbohydrate blend comprising mixing and heating liquid and solid carbohydrates in a mixer until the solid carbohydrate is dissolved;
 b) preparing a hydrocolloid blend comprising hydrating hydrocolloid and a carbohydrate in a separate high shear mixer;
 c) mixing the carbohydrate blend of a) with the heated hydrated hydrocolloid blend of b) in a mixer to form a homogenous blend;
 d) adding to the homogenous blend of c), a dry food product comprising protein and mixing, in a double arm mixer, the homogenous blend and dry food product for about 1 minute at about 60 RPM to form a dough that has a density of 1.00 g/cc to 1.1 g/cc;
 e) aerating the dough in double arm mixer for about 5 to 15 minutes at about 120 RPM to obtain a semi-moist, non-sticky aerated food product having a density of 0.4 g/cc to 0.9 g/cc, wherein no gas or chemical for gassing is added during the aeration process;
 f) optionally, adding flavors and fat to the aerated food product; and
 g) shaping the aerated food product without further prior processing;

wherein the aerated food product comprises from about 50 to 80% carbohydrate of which about 4% to 70% of the carbohydrate is fiber and wherein the fiber is added in step a) and optionally added in the dry food product of d) and optionally added in the aerated dough produced by step e); and wherein the aerated food product comprises from about 4 to 45% protein, which has not been treated with fat.

In one embodiment, in step a), a mixture of glycerin and corn syrup 62 DE are mixed with salt, maltodextrin 150, inulin, fructose and sugar at about 80 to 82 degrees centigrade; in step b), pectin, sugar, water, sodium citrate and sugar mixed together and heated to about 100 degrees centigrade and then cooled to about 85 degrees centigrade; in step d), whey protein isolate hydrolyzed, whey protein concentrate, soy protein isolate, soy protein enzyme modified and inulin are added and mixed with the blend of step c) for about 50 seconds at 60 RPM; and in step e), color is added to the dough and then the dough and color are whipped for about 8 to 12 minutes at 120 RPM and in step f), inulin, peanut flour and flavors are added to the whipped dough.

In another embodiment, in step a), a mixture of glycerin, water, potassium lactate, invert syrup and corn syrup 62 DE are mixed with fructose at about 75 to 80 degrees centigrade; in step b), pectin, fructose and water are mixed together and heated to about 100 degrees centigrade and then cooled to about 85 degrees centigrade; in step d), whey protein isolate, calcium caseinate, tartaric acid, salt and cocoa are added and mixed with the blend of step c) for about 50 seconds at 60 RPM; in step e), the dough is whipped for about 8 to 12 minutes at 120 RPM; and in step f) flavors are added to the whipped dough.

In another embodiment, in step a), a mixture of glycerin, water, potassium lactate, invert syrup and corn syrup 62 DE are mixed with fructose at about 75 to 80 degrees centigrade; in step b), fructose, carrageenan and water are mixed together and heated and maintained at 85 degrees centigrade; in step d), soy protein enzyme modified, oat fiber, inulin, cellulose gel, maltodextrin fiber, salt and titanium dioxide are added and mixed with the blend of step c) for about 50 seconds at 60 RPM; and in step e), the dough is whipped for about 8 to 12 minutes at 120 RPM; and in step f), melted fractionated palm oil mixed into the whipped dough for 10 to 15 seconds at about 15 to 60 RPM; and in step g), the dough is immediately slabbed into a layer.

In another embodiment, in step a), hydrated fructooligosaccharide, crystalline fructose and glycerine are blended; in step b), water, alginate and crystalline fructose are blended; in step d), a homogenous blend of a) and b) is mixed with whey protein, casein calcium, dried egg albumin, gelatin, corn dextrin, crystalline sorbitol powder, salt, chocolate flavor, instant coffee gold cup tartaric acid, ethyl vanillin flavor, a vitamin blend and encapsulated magnesium oxide 40% to form a dough; in step e) the dough of d) is whipped.

DETAILED DESCRIPTION OF THE INVENTION

The present application relates to a process for preparing a non-frozen, solid, aerated food product comprising protein and fiber, wherein after a dough is made and aerated, it can be immediately shaped. By "shaped" means slabbed, slit, extruded or cut. The aerated dough does not need to be further processed (e.g., chilled, dried, frozen) before being shaped. The ingredients of the aerated composition must be food-grade products since the composition is mainly designed for human consumption.

In one embodiment, the aerated food product of the invention comprises about 50% to 80% carbohydrates, where about 4 to 70% of the carbohydrate is fiber; about 4% to 45% protein; about 1% to 5% whipping agent; about 0.5% to 1% stabilizer; and about 0.3% to 1.2% fat.

The aerated food products made according to the process of the invention have densities of about 0.40 to 0.90 g/cc and a moisture level of between about 7% to about 30%, preferably about 7% to 16%.

The percentages used throughout this specification and claims are by weight with respect to the total compositions (w/w) and temperatures are in degrees Celsius unless otherwise indicated.

As used herein, the term "aerated composition" or "aerated food product" refers to a composition which is not a liquid and not frozen but having air or gas pockets surrounded by a matrix. The matrix mainly contains carbohydrates and proteins and, optionally, fat. In an embodiment, the air or gas pockets in the aerated composition are distributed heterogeneously in the composition. In a further embodiment, the air or gas pockets in the aerated composition occupy a smaller volume than the matrix. In another embodiment, the air or gas pockets in the aerated composition occupy a volume substantially similar to the matrix. In yet another embodiment, the air pockets occupy a bigger volume than the matrix. In the preferred embodiment, the air and gas pockets of the composition of the present invention are not formed by gas injection, gassing agents or aeration by way of an Oakes-type process.

The aerated composition described herein comprises protein and fiber. As used herein, the term "protein" is intended to refer to a compound having an amino acid subunit. The amino acid subunit can be linked by a peptidic bond to another amino acid or to another compound. The term protein thus includes amino acids, small peptides as well as polypeptides. The proteins can be from vegetable, animal or synthetic origin. In an embodiment, the proteins of the aerated composition are not from skim milk powder, but are hydrolyzed or non-modified protein isolate derived from milk or from a vegetable source. They can be native proteins or processed proteins (hydrolyzed, lyophilized, modified, addition or removal of an entity such as a glucose group, coupling to another entity, etc.). When the proteins used are modified, they still retain their biological properties, such as their film-forming properties. In an embodiment, the proteins can be hydrolyzed to a specific degree. When hydrolyzed proteins are used, they are able to control the water binding of the aerated composition in order to prevent or delay the hardening of the composition. In a further embodiment, the proteins used in the composition are not denatured. In yet another embodiment, when the aerated composition is coated, the proteins used in the composition are present in the aerated composition itself but are essentially absent from the coating. In yet another embodiment, the proteins present in the composition are not treated with fat.

In one embodiment, the amount of the protein in the aerated composition is between 4% to 45% and preferably at least 10% or greater than 10%. In an embodiment, the protein content of the aerated composition is between about 10% and 45% and, in a further embodiment, between about 4% and 35% or between 15% and 35%. Protein content may be quantified in food compositions by methods known to those skilled in the art. The method for achieving these results may either be indirect or direct methods. These methods include, but are not limited to, the determination of total nitrogen content, ion-exchange, gas-liquid or high-performance liquid chromatography. Another method includes determining the proteins content of the aerated compositions by calculating the proteins content of the food material used to produce the compositions. These methods usually generate a percentage of proteins with respect to the total compositions (w/w).

The proteins used in the compositions preferably have a reduced water binding ability. Proteins with high water binding capacity tend to harden the aerated composition. Usually, when proteins are added to an aerated composition, they tend to attract and/or retain water. The water binding ability thus favors the movement of the protein and of components of the matrix of the composition and, eventually the filing of the air pockets (e.g. lowering of the number of air pockets and/or of the area occupied by the air pockets) of the composition, thereby causing the hardening of the composition. Therefore, the proteins usually tend to augment the density of the aerated composition.

Suitable proteins that can be used in the aerated composition described herein can be, for example, non-hydrolyzed proteins such as whey protein isolate or concentrate, caseinates, acid casein, milk protein concentrate or isolate, soy protein isolate, hydrolyzed proteins (such as hydrolyzed whey protein, hydrolyzed gelatin, hydrolyzed soy protein isolate, hydrolyzed milk protein isolate, hydrolyzed caseinates, and/or hydrolyzed vegetable protein isolate), peptides or amino acids. One advantage of using a hydrolyzed protein is that the hydrolysis reduces substantially the water holding or binding ability of proteins. Several proteins are commercially available or may be hydrolyzed to a predetermined degree. Such proteins are, for example, soy protein, whey protein, milk protein, caseinates, vegetable proteins and egg albumin. Suitable vegetable proteins include pea and rice protein.

The dough comprising protein and fiber has a density of about 1.0 g/cc to about 1.1 g/cc. Once aerated, the composition has a density between about 0.40 g/cc and about 0.95 g/cc, depending on the method of producing the composition. In an embodiment, the density of the composition is between about 0.4 g/cc to about 0.9 g/cc and, in a further embodiment, the density is between about 0.5 to about 0.75 g/cc. As used herein, the terms "density" and "specific gravity" are used interchangeably and refer to the ratio of the weight of the composition to that of an equal volume of water at t'° and V. Unless otherwise specified, the specific gravity (d) means the ratio of the weight of the sample to that of an equal volume of water at 20°. The density of a composition is thus defined as the ratio of the density of the substance to the density of water (1 gram/cm3 or g/cc). This ratio is a convenient physical property since it has no units and is therefore independent of the system of measure used to determine it. The density may be determined by using an instrument such as a pycnometer, Mohr-Westphal Balance, hydrometer, Sprengel-Ostwald pycnometer and/or density/specific gravity meter. The density can also be determined by using the density by buoyancy force principle using Archimedes' principle. Archimedes' principle states that the buoyant force experienced by a submerged object is equal to the weight of the liquid displaced by the object. Experimentally this appears in the fact that the submerged object apparently weighs less by an amount equal to the weight of the liquid displaced. The buoyant force ($F_b$) can be expressed as:

$$F_b = W_{air} - W_{liquid} = dgv$$

where d is the density of the liquid, g is the acceleration of gravity and v is the volume of the immersed object (or the immersed part of the body if it floats). The specific gravity or density can be calculated by weighing the aerated composition sample in air then obtaining the volume it displaces by applying force against buoyant force just enough to submerge the solid completely. The density of the composition may be modified by altering the ingredients of the composition and/or adjusting the processing conditions. In one embodiment, aerating gases such as carbon dioxide, nitrogen and air can be used to modulate the density of the composition. In the preferred method, an Oakes-type process is not used and no aerating gases or gasing agents are used.

The aerated composition described herein is semi-moist and non-sticky, which means that it and can be slabbed immediately after aeration without further processing, such as drying or setting, except for the optional addition of fats and flavors. More specifically, the aerated compositions of the present invention possess a moisture level between about 7% and about 30%. As used herein, the term "moisture level" refers to the percentage of water in a composition (w/w). Methods and instruments for evaluating the moisture level of foods are known to those skilled in the art. Such methods include, but are not limited to, evaporation methods, distillation methods, chemical reaction methods (such as the Karl-Fisher titration and the gas production method), physical methods and spectrometric methods (such as X-rays, UV-visible, NMR, microwaves and IR). The moisture content in the aerated composition can be also calculated during formulation by knowing and adding the moisture of each ingredients.

The aerated composition can also comprise a whipping agent. Such agents are known in the art and conventionally are used in small amounts, typically between about 0.01% to about 20.0% by weight. Preferably, the amount of whipping agent is from about 1% to about 5%. The whipping agent may be egg white, as egg albumen, vegetable proteins, soy-derived protein, milk-derived compound, milk protein, modified milk protein, casein, caseinate, whey protein, pea protein and/or wheat gluten and mixtures thereof. In a preferred embodiment, the whipping agent is egg white or a soy-based whipping agent.

The invention may further comprise an emulsifier or whipping aid, i.e. a surface-active agent promoting the formation and stabilization of the emulsion. Such emulsifiers include, but are not limited to, an ester of polyglycerol, lactylate of sodium, lactylate of potassium, lactylate of calcium, lactate of sodium, lactate of potassium and/or lactacte of calcium. The addition of small amount of fat (less than 5% or less than 2%) and an emulsifier that can facilitate the processing of the aerated composition by helping handling and shaping the aerated composition. The addition of an ester of polyglycerol, lactylate of sodium, lactylate of potassium, lactylate of calcium, lactate of sodium, lactate of potassium and/or lactacte of calcium can also act as humectants to protect the air pockets of the aerated composition and hence provide appropriate density/texture to the composition.

In a preferred embodiment, emulsifiers/whipping aids that firm the air cells and improve the gas/air holding capacity of an aerated matrix are lactates of sodium, potassium or calcium and comprise from 0.5% to 2% of the total composition.

The aerated food composition may also comprise fat and may preferably have a low fat content. In an embodiment, the aerated composition, without a coat, comprises less than 5% and preferably less than 2% and most preferably between about 0.3% and about 1.2% of fat (w/w). In another embodiment, when the composition comprises a coating, its fat content is higher than 2%, preferably higher than 5%. Examples of fat that can be used in the composition are fractionated fat, partially fractionated fat, hydrogenated oil, partially hydrogenated oil, unsaturated oil, coconut oil, palm oil, palm kernel oil, cottonseed oil, safflower oil, sunflower oil, soy oil, corn oil, monoglyceride and/or lecithin. Although fat is an optional ingredient, if used, fat is preferably added in liquid form at room temperature immediately after the aeration step as a realized agent.

The aerated food composition may also comprise a stabilizer to achieve the desired organoleptic properties. Such stabilizer may be a hydrocolloid, a gelatin and/or a gum. Examples of such stabilizers include, but are not limited to a plant exudate, arabic gum, tragacanth, karaya, ghatti, seaweed extract agar, alginate, carrageenans furcellaran, plant seed gum, guar gum, locust bean, psyllium, quince, tamarind, non-fermentable cereal gum, corn hull gum, plant extract, arabinogalactan, fermentation gum, dextran, xanthan and curdlan. Preferably, the amount of the stabilizer is from about 0.5% to about 1% (w/w).

The aerated food composition made according to the method of the invention also comprises carbohydrates. For instance, the present aerated compositions may comprise from about 37% to about 80% (w/w), of a carbohydrate, preferably from about 50% to about 80% (w/w) carbohydrate. About 4% to about 70% of the carbohydrate is fiber. In an embodiment, the ratio of proteins to carbohydrates in the composition is less than one. The carbohydrates may be, for example monosaccharide (e.g. a single sugar molecule, such as glucose, fructose or galactose), a disaccharide (e.g. a sugar having two saccharide subunits, such as sucrose, lactose or maltose), a non-starch polysaccharide (e.g. a fiber, such as cellulose, pectin, gum, beta-glucan or fructan, fructo-oligosaccharide, oligofructose, maltodextrin, cellulose gel, fruit fiber, corn dextrin, and wheat dextrin), a sugar alcohol (e.g. polyol such as sorbitol, mannitol, xylitol, erythritol, maltitol, lactitol or glycerol), an oligosaccharide (e.g. a chain of three to ten monosaccharide units, such as raffinose, stachyose, verbascose or fructooligosaccharide) and a polysaccharide (e.g. a chain of more than ten monosaccharide units, such as starch, dextrin, inulin or polydextrose). Preferred carbohydrates are sugar, fructose dextrose, polydextrose, high fructose corn syrups, high maltose corn syrups, corn syrups, inverted syrups, glycerin, sorbitol syrup, crystal maltitol, maltitol syrup, isomalt, xylitol, and lactitol.

In one embodiment, the liquid carbohydrate blend used in the process of the invention may be a commercially available "marshmallow syrup". A marshmallow syrup (or marshmallow liquid mix) is the mixture of ingredients that is customarily aerated and whipped to form marshmallow. The marshmallow syrup may contain ingredients such as fructose, high fructose corn syrup, corn syrup, honey, sucrose, sorbitol (liquid or powder), maltitol, isomalt, oligofructose (hydrolyzed inuline), fructooligosaccharide (FOS), inulin, glycerine, cane juice concentrate, fruit juice concentrate, etc.

The aerated composition may also comprise flavoring agents known to modify the taste of aerated products. These flavoring agents can enhance the taste properties of the aerated composition particularly in compositions having a low fat (e.g. less than 1% percent by weight fat). Aerated products having a low fat content usually do not show fat being precluded during whipping and aeration. Some attempts have been made to increase the oil or fat content in aerated products, generally by the addition of certain additives which prevent the oil from breaking the emulsion or whip. While these attempts have met minor success in providing incremental increases in fat content, the additional additives have created an off-taste or foreign taste which has made the marshmallow product unacceptable. Ingredients that may be included are artificial and natural sweeteners, colors, edible acids, such as citric acid, malic acid and sodium acid sulfate, cocoa powder and peanut flour.

The aerated compositions of the present invention also may comprise vitamins and/or minerals.

The aerated compositions produced are solid or semi-solid, preferably very palatable with a soft texture and have good organoleptic properties. The aerated compositions described herein can also be shaped easily in various forms. In one embodiment, the aerated product can be shaped in a nougat-typed product and/or a marshmallow-type product. The aerated compositions can also be coated (enrobed) or not or filled in various containers. The aerated composition can also be included in a layer in a nutritional bar (coated or uncoated). For instance, the aerated food product could be incorporated as an aerated top, middle or bottom layer of a food product or could be an un-layered, stand-alone product. In a preferred embodiment, the aerated product is a bar.

The present invention also provides a process for preparing the aerated composition described herein. The matrix of these confections may make use of a crystallized or not crystallized sugar in order to achieve desired textural properties for the confections.

The process for making such compositions first comprises preparing a liquid blend. Such liquid blend comprises water or an aqueous solution (such as milk or juices), as well as carbohydrates (in powder or liquid form), with at least a part of the carbohydrates being fiber. Optionally, the liquid blend may also comprise a stabilizer, a pre-hydrated hydrocolloid, flavors and/or colors. The ingredients of the liquid blend are mixed until they are dissolved. The liquid blend is then added to (e.g. dropped on) a powder blend, mixed and whipped to form the aeration composition. The powder blend comprises proteins and, optionally, carbohydrates, flavors and/or colors. In an embodiment, the liquid blend is heated at a temperature between about 60° C. to 105° C. (e.g. 75° C. to 85° C.) prior to their incorporation in the powder blend. Optionally, an emulsifier can be added to the powder blend, before, simultaneously or after adding the liquid blend. In an embodiment, the powder blend is mixed with a dough mixer, such as a double arm sigma type high speed dough mixer. In a further embodiment, the powder blend is mixed for a time period of one minute before being added to the liquid blend. In a further embodiment, the mixing of the liquid blend with the powder blend lasts between 15 to 45 seconds. Optionally, the first mixing of the liquid blend can be followed by a second mixing lasting between 15 to 45 seconds at a higher pace (e.g. about two times higher than the first mixing). The second mixing period can be followed by a third mixing period of between 1 to 5 minutes, at a higher mixing speed (e.g. about three times higher than the first mixing). In an embodiment, the first mixing lasts between 25 to 35 seconds at a speed of between 25 to 35 RPM, the second mixing lasts between 25 to 35 seconds at a speed of between 55 to 65 RPM, and the third mixing lasts between 2 to 4 minutes at a speed of between 85 to 105 RPM. Thus, the method of the invention differs from the Oakes-type method of manufacturing aerated confections in that what is aerated is a dough, rather than a liquid blend.

One advantage of the process described herein is that there is no need to inject air or a gas in the composition to produce an aerated composition having the appropriate texture properties. Therefore, the aerated composition can be produced at normal atmospheric pressure. In an embodiment, the process can be modified to include the injection of air or gas in the composition.

In another embodiment, the process of the invention produces an aerated food component that can be shaped immediately after the aeration of a dough mixture. The process comprises:
a) providing a liquid carbohydrate blend or preparing a liquid carbohydrate blend or solution by mixing in a mixer the aqueous materials and solids materials consisting essentially of carbohydrates (total soluble solids comprise from 75-90%);
b) providing a hydrated hydrocolloid or hydrating a hydrocolloid in a mixer;
c) adding the liquid solution prepared in step a) and the hydrated hydrocolloid prepared in step b) to a mixer and mixing long enough to form a homogenous blend;
d) adding dry food ingredients comprising protein and optionally carbohydrates to the mixer of c);
e) mixing the dry ingredients and liquid ingredients in the mixer to obtain dough that has a density of about from 1.00 g/cc to 1.1 g/cc;
f) aerating the dough of e) by whipping it at about 120 RPM for about 5-15 min in a double arm mixer to obtain a semi/moist non sticky aerated food component that has a density of about from 0.4 g/cc to 0.9 g/cc;
g) optionally, adding fat to the aerated product of f) and mixing for about 15-75 seconds at about 15-60 RPM. The aerated component can be shaped immediately after aeration. For instance, the aerated product can be slabbed, slit and cut without prior chilling, drying or setting.

The process essentially includes adding and mixing the liquid carbohydrate blend comprising fiber with the powder blend comprising protein and carbohydrates to form dough with a density of 1.0-1.1 g/cc. Then this dough is whipped in a high speed double arm mixer at 120 RPM for 5-15 min. One of skill in the art would understand what types of equipment are suitable for mixing and aerating in this process and that times and speeds can be adjusted accordingly. However, in a preferred embodiment, steps a) and b) are done in a high shear liquid mixers. Steps c)-f) are performed in double arm sigma mixers. Preferably, step c) is performed in a double arm mixer for about 1 minute at 60 RPM. Step e) is performed in a double arm sigma mixer for about 1 min at about 60 RPM. Step f) is done in a high speed double arm sigma mixer at about 120 RPM for about 5 to 15 minutes. Step g) is performed in the double arm sigma mixer at about 15 to 60 RPM for about 15 to 75 seconds.

The aerated food product produced by the above process comprises from about 50% to 80% carbohydrate of which about 4% to 70% is fiber. The fiber is added in step a) and optionally in steps d) and e). The aerated food product comprises from about 4% to 45% protein, which has not been treated with fat. In one embodiment, in step a), the liquid blend is heated to a temperature of about 75° to 109° C., preferably about 65° to 95° C. In step c) the temperature of the mixer is form about 25° C. to 35° C.

Figure 1:
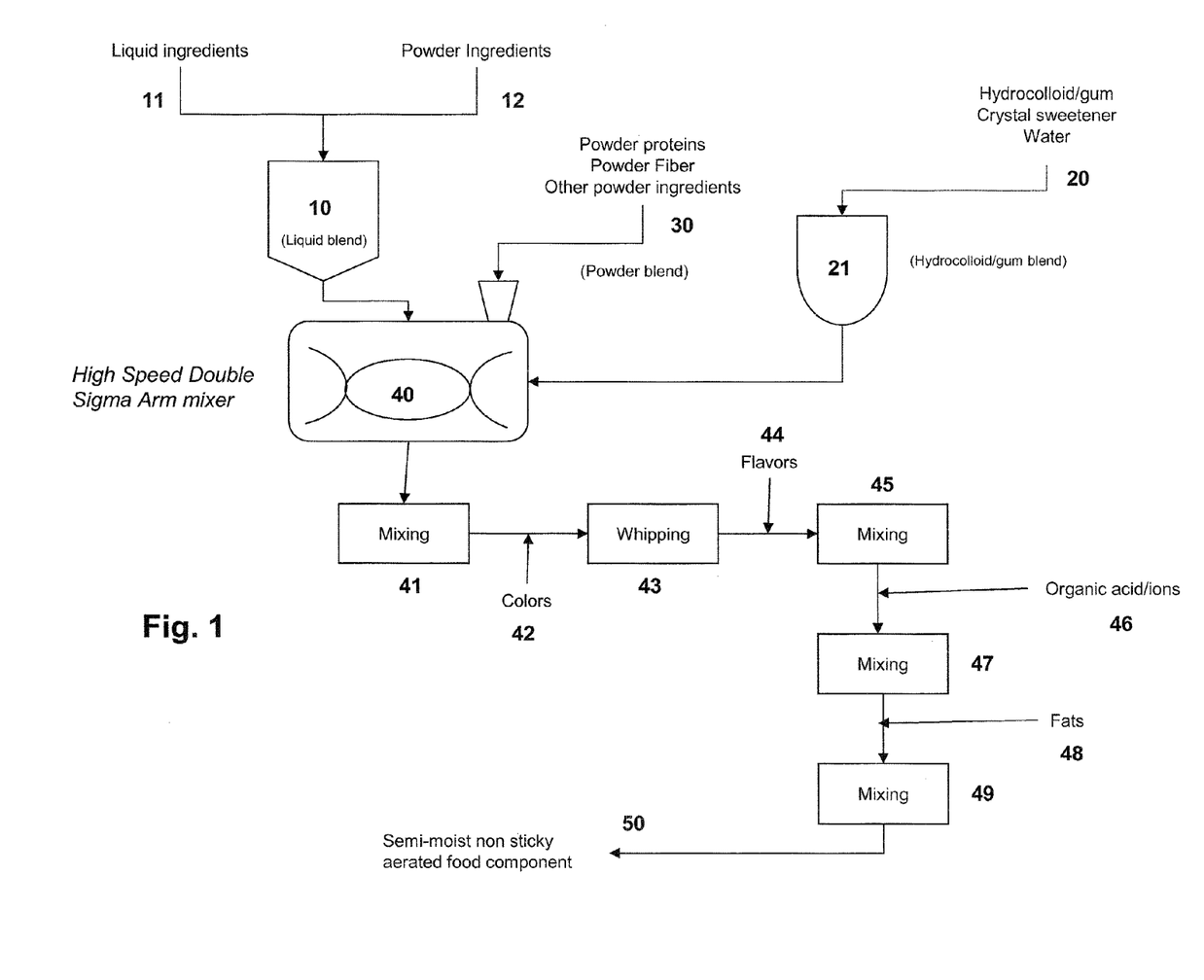
FIG. 1 shows a flow chart of this novel process to produce an aerated food component that can be slabbed immediately after the aeration of dough mixture.

FIG. 1 shows a schematic flow chart of the process. Sequential numbers are given to each step of the process and equipment. The process starts by mixing the liquid blend in a jacketed high shear liquid mixer (10). The liquid carbohydrates (11) are added into high shear liquid mixer followed by powdered carbohydrate powder ingredients (12). The liquid carbohydrates include, but are not limited to: glycerine, inverted sugar, polydextrose syrups, corn syrups, sorbitol syrup, maltitol syrup, high maltose corn syrup (HMCS), high fructose corn syrup (HFCS). The carbohydrate powder ingredients include, but are not limited to: sucrose, fructose, sorbitol, maltitol, dextrose, fructo-oligosaccharide, inulin, polydextrose, oat fiber, corn dextrine or wheat dextrine. The liquid and powdered/crystal ingredients are mixed and heated to temperatures to until all powdered/crystal ingredients are dissolved (75°-109° C.). This liquid blend has total soluble solids of about 75%-90%. Colors could be added also at this step (12) or directly to the high speed double arm mixer (42).

The hydrocolloid and/or gums are hydrated (20) in a separated jacketed high shear liquid mixed (21). Hydrocolloids and/or gums are first dispersed in any crystal carbohydrate or carbohydrate syrup. Then they are mixed with hot water to have total soluble solids of 40% maximum. This hydrocolloid and/or gum blend is heated to 85° C.-100° C. and held in a holding tank (21) until they are used.

The liquid blend then is dropped into a high speed double arm mixer (40). The hydrocolloid and/or gum blend is dropped into the mixer at the same time. This blend is mixed at medium speed (60 RPM) for at least 1 min (41), to form a homogenous liquid blend.

At this point the remaining powder ingredients (30) are added to the high speed double sigma arm mixer (40), and mixed with the liquid blend for 1 min at 60 RPM to have homogenous dough (41). This dough has a density of 1.0 g/cc to 1.1 g/cc. Then this dough is whipped (43) at 120 RPM for 5-15 min to obtain a semi-moist aerated food component. At this point the aerated dough has a temperature about 45° C.-60° C., and a density of 0.4 g/cc to 0.9 g/cc.

Flavors (44) can be added after the aeration step and mixed for 15-30 seconds at 15 to 60 RPM. (45).

Organic acids or ions of Ca++ of K++ (46) (if the formula requires some to set the hydrocolloids) can be added after the flavors are mixed and then mixed for about 15 to 30 seconds at about 15 to 60 RPM (47).

Fat is added at the last step (48), as it is used only as realized agent and is mixed for about 15-75 seconds at 15-60 RPM (49).

The aerated solid food product is then ready to use as is. It does not require further processing, such as chilling, freezing or drying. However, the aerated food product may be taken out from the mixer onto a conveyer belt directly or on a dough table in bins to feed the slab (50) bar manufacturing line. This semi-moist, non sticky aerated component is then further slab, slit and guillotined to any desired size and shape (typically bar). The aerated product can be part of a multiple layered bar, e.g. it be put on top of, underneath or in between two layers as a sandwich and further processed.

Once in final form, the aerated composition can be enrobed with confectionery coating specially design to protect soft center of the aerated composition. In another embodiment, the aerated food product is not enrobed. The aerated product is placed in an air-sealed wrapping or container without additives to maintain moisture or density.

The present invention will be more readily understood by referring to the following examples which are given to illustrate the invention rather than to limit its scope.

Example 1

The liquid carbohydrates (11) are added to the high shear liquid mix (10) comprised of glycerin, corn syrup 42 DE and mixed. Then, the (12) salt, maltodextrin 150, inulin, fructose and sugar are added and mixed. The mixture is heated to 80-82° C. with total solids of 86-87%.

TABLE 1

| Ingredient | % by Weight |
|---|---|
| Glycerine | 8.31% |
| Corn Syrup 62 DE | 13.24% |
| Salt | 0.83% |
| Maltodextrine 150 | 8.31% |
| Inulin | 10.01% |
| Fructose | 13.51% |
| Sugar | 1.19% |
| HM Pectin Solution | 13.49% |
| Whey Protein Isolate Hydrolyzed | 1.33% |
| Whey Protein Concentrate | 8.92% |
| Soy Protein Isolate | 3.12% |
| Soy Protein Enzyme Modified | 3.16% |
| Inulin | 4.75% |
| Caramel color | 0.52% |
| Peanut Flour | 3.12% |
| Inulin | 5.26% |
| Flavor | 0.33% |
| Sodium Acid Sulfate | 0.10% |
| Water to hydrate the acid | 0.49% |
| TOTAL | 100.00% |

The HM Pectin solution is prepared in separated high shear liquid mixer (21). The composition of this solution is given in the TABLE 2. The water is added into the mixer and heated to 75° C.-85° C. Then the sodium citrate is added and mixed with the water at high shear. The pectin is dispersed with the first sugar quantity and added to the water, until well dissolved. This solution has 39-41% of solids. The solution is heated to 100° C. The remained sugar is added to the mixer and mixed to obtain a solution of 53-55% of solids. The solution is cool down to 85° C. and kept it at this temperature until needed.

Then the liquid blend and the HM Pectin solution are dropped into the high speed double arm sigma mixer, and mixed (40). The blend is at this point around 78-85° C. and 80%-82% solids.

TABLE 2

| Ingredients | % by weight |
|---|---|
| Pectin | 4.15% |
| Sugar | 18.22% |
| Water | 58.71% |
| Sodium citrate | 1.13% |
| Sugar | 17.79% |
| TOTAL | 100.00 |

The protein blend (30) comprised of whey protein isolate hydrolyzed, whey protein concentrate, soy protein isolate, soy protein enzyme modified and inulin are added to the high speed double sigma arm mixer (40) and mixed with the liquid for 50 seconds at 60 RPM to form a dough mixture. The colors (42) are then added to the dough mixture and whipped (43) for 8-12 minutes at 120 RPM. The rest of inulin, the peanut flour and flavors are added after the whipped step (44). In this Example 1 the total inulin powder (20.1%) is divided into three portions and added to 10.01% to the liquid blend, 4.75% to the powder blend and 5.26% added to the dough after the whipping step. Dividing the inulin in these three portions improved the final density of this example (0.63-0.67 g/cc).

Example 2

Using this novel process it is possible to increase the level of protein of this semi-moist non sticky aerated component as is shown in Example 2. The mixing procedure is similar as described in Example 1. The liquids materials (11) are added to the high shear liquid mixed (10) comprised of glycerin, water, potassium lactate, invert syrup, and corn syrup 62 DE and mixed. Then the fructose is (12) added and mixed. The mixture is heated to 75° C.-80° C. with total solids of 86%-87%.

TABLE 3

| Ingredients | % by weight |
|---|---|
| Glycerine | 5.00% |
| Water | 2.34% |
| Potassium Lactate | 0.64% |
| Invert Syrups | 15.36% |
| Fructose | 16.82% |
| Oligofructose | 5.06% |
| Corn Syrup 62 DE | 5.24% |
| Malic Acid | 0.15% |
| Water | 5.76% |
| Fructose | 2.94% |
| LM Pectin | 1.06% |
| Soy Protein Enzyme Modified | 4.74% |
| Whey Protein Isolate | 12.00% |
| Calcium Caseinate | 8.09% |
| Whey Protein Isolate Hydrolyzed | 7.44% |
| Milk Protein Isolate | 2.00% |
| Tartaric Acid | 0.15% |
| Salt | 0.30% |
| Cocoa | 3.50% |
| Flavor | 1.40% |
| TOTAL | 100.00 |

The LM pectin solution (20) is prepared in separated high shear liquid mixer (21), using the same method as explained in Example 1. In this Example 2, the composition of this solution is fructose, pectin and water. The solution is heated to 100° C., to have 40% total solids. The solution is cool down to 85° C. and kept it at this temperature until is need. This LM pectin solution is then dropped to the high speed double sigma arm mixer and mixed (40). The whole liquid blend is at this point around 78-85° C. and 75%-80% solids.

The protein blend (30) comprised of whey protein isolate, calcium caseinate, whey protein isolate hydrolyzed, milk protein and soy protein enzyme modified, tartaric acid, salt and cocoa are added to the high speed double sigma arm mixer (40) and mixed with the liquid for 50 seconds at 60 RPM to form a dough mixture. The dough is then whipped (43) for 8-12 minutes at 120 RPM. Flavors are added after whipping step (44) and mixed (45). The final density of this Example 2 is about from 0.58-0.64 g/cc.

Example 3

Increasing the fiber in this semi-moist aerated component is also possible with this novel process, as is shown in Example 3. The mixing procedure is basically the same as described in Example 1. The liquids materials (11) are added to the high shear liquid mixed (10) and comprised of glycerin, water, potassium lactate, invert syrup, and corn syrup 62 DE and mixed. Then the fructose is (12) added and mixed. The mixture is heated to 100° C.-105° C. with total solids of 86%-88%. Then the mixture is cooling down to 85° C.

TABLE 4

| Ingredient | % by Weight |
| --- | --- |
| Glycerine | 1.00% |
| Maltitol Syrup | 15.00% |
| Polydextrose syrup | 7.00% |
| Maltitol crystalline | 7.70% |
| Fructose | 12.00% |
| Con Syrup 42DE | 4.90% |
| Oligofructose | 2.80% |
| Maltodextrin Fiber | 3.00% |
| Polydextrose powder | 3.60% |
| Oat Fiber | 2.20% |
| Fructose | 3.00% |
| Carrageenan | 0.40% |
| Water | 6.10% |
| Soy Protein Enzyme Modified | 5.10% |
| Oat Fiber | 9.00% |
| Inulin | 1.80% |
| Cellulose gel | 5.90% |
| Maltodextrin fiber | 4.10% |
| Salt | 0.50% |
| Titanium dioxide | 2.50% |
| Flavor | 1.1% |
| Sucralose solution | 0.10% |
| Fractionated Kernel oil | 1.20% |
| TOTAL | 100.00 |

The carrageenan solution is prepared in separated high shear liquid mixer (21). Using the same method as explained in Example 1. The composition of this solution is Fructose, carrageenan and water. The solution is heated to 85° C. The solution kept at this temperature until is need. This Carrageenan solution is then dropped to the high speed double sigma arm mixer (40), at the same time as the liquid blend and mix.

The powder blend (30) mainly comprised of Soy protein enzyme modified, oat fiber, iulin, cellulose gel, maltodextrin fiber, salt and titanium dioxide, is added to the high speed double sigma arm mixer (40) and mixed (41) with the liquid for 50 seconds at 60 RPM to form a dough mixture. The dough is then whipped (43) for 8-12 minutes at 120 RPM. Melted Fractionated palm oil is added at the last step (48), as it is used only as realized agent and mixed for 10-15 seconds at 15-60 RPM (49). This aerated food component could be slab (50) in a slab line and use as top layer, bottom layer or as is. The final density of this example 2 is about from 0.58-0.67 g/cc.

Example 4

Vanilla Fructose and Sorbitol Aerated Composition

Table 5 lists the quantity of ingredients used to prepare the composition.

The ingredients of the liquid blend were mixed and heated between 75° C. to 85° C. The liquid blend was then transferred to a heated holding tank. The temperature of the liquid mixture in the holding tank was maintained between 75° C. to 85° C. The ingredients of the powder blend #1 and #2 were independently mixed and then combined. The heated liquid mixture was dropped on top of the powder blend. The mixture is then left to cool down for a couple of minutes. Finally the fats were pre-melted and added to the mixture. The final mixture was jogged before the aerated composition was removed from the mixer for processing (e.g. shaped). The aerated composition can be further slabbed and shaped or it can then be layered on top of a more rigid structure core dough or sandwiched between two more rigid structures core dough.

Per serving of 100 g, this composition has 316.4 Cal, 32.5 g of proteins, 50.0 g of carbohydrates, 2.1 g of dietary fibers, 19.4 g of total sugar, 1.7 g of fat and 12. g of water. The density of the composition is between 0.5 to 0.65 g/cc.

TABLE 5

Quantity (in kg) of the ingredients used in the preparation of the composition.

| Ingredients | kg |
| --- | --- |
| Dicalcium Phosphate | 5.97 |
| Magnesium oxide | 3.98 |
| Powder blend #1 | |
| Whey protein isolate | 100.00 |
| Whey protein isolate | 50.00 |
| Caseinate calcium | 40.00 |
| Whey protein isolate | 35.00 |
| Dried egg albumen | 30.00 |
| Gelatin | 30.00 |
| Corn dextrin | 20.00 |
| Tartaric acid | 1.30 |
| Cinnamon brown color | 3.00 |
| Caramel flavor | 5.00 |
| Vanilla creamy flavor | 3.00 |
| Natural and artificial cream flavor | 3.00 |
| Powder blend #2 | |
| Powdered sucralose | 0.05 |
| Water | 0.15 |
| Liquid blend | |
| High fructose corn syrup | 194.5 |
| Crystalline sorbitol powder | 168.90 |
| Glycerine | 33.60 |
| Water | 26.00 |
| Potassium Lactate | 5.30 |
| Fats | |
| Monoglycerides | 4.00 |
| Modified Palm Kernel Oil | 7.00 |
| Total weight | 773 |

Example 5

Aerated composition with a caramel layer and having a coffee almond flavor without any egg ingredient as a whipping agent.

TABLE 6

Quantity (in percentage of final weight) of the ingredients used in the preparation of the composition.

| Ingredients | % |
|---|---|
| Powder blend | |
| Whipping agent | 1.92% |
| Soy protein isolate | 0.66% |
| Whey protein isolate | 4.72% |
| Caseinate calcium | 2.83% |
| Whey protein isolate | 2.13% |
| Tartaric acid | 0.06% |
| Corn dextrin | 0.43% |
| Vanilla creamy flavor | 0.23% |
| Salt | 0.06% |
| Chocolate flavor | 0.13% |
| Instant coffee | 0.03% |
| Glycerine | 1.36% |
| Liquid blend | |
| Sorbitol solution 70% | 4.60% |
| Evaporated cane juice syrup certified organic | 2.70% |
| Potassium lactate | 0.26% |
| Crystalline maltitol | 4.85% |
| Crystalline fructose | 4.05% |
| Sugar | 4.05% |
| Beet extract | 0.03% |
| Caramel color powder | 0.22% |
| Black cocoa powder | 0.02% |
| Pectin solution | |
| Water | 2.37% |
| Crystalline fructose | 1.19% |
| Pectin | 0.43% |
| Flavors | |
| Debitterizing | 0.36% |
| Chocolate semi-sweet | 0.48% |
| Fats | |
| Monoglycerides | 0.19% |
| Modified Palm Kernel Oil | 0.34% |
| Caramel bottom layer | |
| Vitamin blend | 0.85% |
| Encapsulated magnesium oxide 40% | 0.31% |
| Tricalcium phosphate | 0.55% |
| Caramel sugar | 16.66% |
| Topping | |
| Almonds, roasted, diced large | 6.32% |
| Coating | |
| Milk chocolate coating | 34.58% |

Table 6 lists the quantity of ingredients used to prepare the composition. The ingredients of the powder blend were mixed. The ingredients of the liquid blend are mixed, heated to 105° C. and then cooled down to 60° C. before their addition to the powder blend. A pectin solution is prepared by pre-blending the fructose and pectin and adding the pre-blend to heated water (80° C.-90° C.) while mixing at high speed. The liquid blend and the pectin solution are added simultaneously to the powder blend. The blend is then mixed to allow the hydration of the powder blend ingredients. The blend is further whipped for several minutes. The flavors are then added to the blend. The blend is further whipped for one minute. The blend is left to cool down for five minutes. The fats, pre-melted at a temperature of 40° C., are then added to the blend to produce the aerated composition. The aerated composition is then placed on top of a caramel bottom layer. It is further sprinkled with almonds and enrobed in a chocolate coating.

Per serving of 100 g, this composition has 419.5 Cal, 20.9 g of proteins, 50.7 g of carbohydrates, 2.3 g of dietary fibers, 34.9 g of total sugar, 16.3 g of fat and 8.8 g of water. Because the composition of this example is coated with caramel, the total fat is higher than 2% (w/w) and the moisture is lower than 10%. The aerated composition of this example, without a caramel layer has a fat content of less than 2% and a moisture content higher than 10%. The density of the composition is between 0.55 to 0.75 g/cc.

Example 6

Almond Chocolate Aerated Composition

Table 7 lists the quantity of ingredients used to prepare the composition. The ingredients of the powder blend #1 are mixed together. The ingredients of the powder blend #2 are mixed together. The ingredients of the liquid blend #1 are mixed in a high speed mixer and heated at 75° C. The fructooligosaccharide (FOS) is then hydrated in water. The hydrated FOS and the ingredients of the liquid blend #2 are added to the liquid blend #1 to produce the liquid blend. The liquid blend is then added to the powder blend #1. The blend is mixed to hydrate the powdered ingredients. The blend is then whipped for several minutes. The powder blend #2 and the almond flavor are then added to the blend. The blend is whipped for one minute. The blend is left to cool down for a couple of minutes and then the fats are added.

Per serving of 100 g, this composition has 342.2 Cal, 31.5 g of proteins, 50.0 g of 10 carbohydrates, 10 g of dietary fibers, 28.1 g of total sugar, 2.1 g of fat and 13.2 g of water. The density of the composition is between 0.50 to 0.65 g/cc.

TABLE 7

Quantity (in percentage of final weight) of the ingredients used in the preparation of the composition.

| Ingredients | % |
|---|---|
| Powder blend #1 | |
| Whey protein isolate | 10.71% |
| Whey protein isolate | 5.41% |
| Caseinate calcium | 5.92% |
| Whey protein isolate | 5.41% |
| Dried egg albumen | 4.08% |
| Gelatin | 3.88% |
| Corn dextrin | 2.48% |
| Crystallinesorbitol powder | 1.93% |
| Salt | 0.41% |
| Chocolate flavor | 0.88% |
| Instant coffee gold cup | 0.20% |
| Tartaric acid | 0.12% |
| Ethyl vanillin flavor | 0.05% |
| Powder blend #2 | |
| Vitamin blend | 0.61% |
| Encapsulated magnesium Oxide 40% | 0.47% |
| Liquid blend #1 | |
| Water | 1.50% |
| Alginate blend | 0.19% |
| Crystalline fructose | 0.25% |

TABLE 7-continued

Quantity (in percentage of final weight) of the ingredients used in the preparation of the composition.

| Ingredients | % |
|---|---|
| FOS | |
| Water | 7.70% |
| Fructooligosaccharide powder | 8.62% |
| Liquid blend #2 | |
| Crystalline fructose | 27.05% |
| Glycerine | 7.36% |
| Potassium lactate | 1.70% |
| Cocoa extract flavor | 1.10% |
| Debitterizing | 0.41% |
| Caramel color powdered | 0.10% |
| Lake blend chocolate color | 0.02% |
| Fats | |
| Monoglycerides | 0.67% |
| Modified Palm Kernel Oil | 0.77% |

Example 7

Chocolate Aerated Composition

Table 8 lists the quantity of ingredients used to prepare the chocolate aerated composition.

The ingredients of the powder blend are mixed together. The ingredients of the liquid blend #1 are mixed and heated to 80° C. The ingredients of the liquid blend #2 are mixed and are added to the liquid blend #1 to produce the liquid mixture. The liquid blend is dropped on the powder blend, mixed and whipped 30 RPM for 30 seconds, 60 RPM for 30 seconds and 90-100 rpm for 2 to 4 minutes. During these mixing stages the minerals, vitamins and foam stabilizers (optional-either with liquid or powdered at this stage) may be added. The blend is left to cool down for a couple of minutes. Melted fats are then added to the mixture to form the final aerated composition.

Per serving of 100 g, this composition has 350.0 Cal, 30.3 g of proteins, 54.1 g of carbohydrates, 2.7 g of dietary fibers, 42.2 g of total sugar, 1.4 g of fat and 12.2 g of water. The density of the composition is between 0.55 to 0.75 g/cc.

TABLE 8

Quantity (in percentage of final weight) of the ingredients used in the preparation of chocolate aerated composition.

| Ingredients | % |
|---|---|
| Powder mixture | |
| Whey protein isolate | 10.92 |
| Caseinate | 7.92 |
| Whey protein isolate | 6.25 |
| Whey protein isolate | 6.04 |
| Dried egg albumen | 3.38 |
| Corn dextrin | 3.28 |
| Chocolate flavor | 2.82 |
| Nat Protein Masking | 0.96 |
| Tartaric acid | 0.12 |
| Vanillin flavor | 0.10 |
| Liquid mixture #1 | |
| High fructose corn syrup invertose | 25.95 |
| Crystalline fructose | 21.81 |
| Water | 2.28 |
| Glycerine | 4.63 |
| Potassium lactate | 0.69 |

TABLE 8-continued

Quantity (in percentage of final weight) of the ingredients used in the preparation of chocolate aerated composition.

| Ingredients | % |
|---|---|
| Caramel color powdered | 0.16 |
| Lake blend chocolate color | 0.03 |
| Liquid mixture #2 | |
| Water | 1.17 |
| Alginate blend | 0.12 |
| Crystalline fructose | 0.23 |
| Fats | |
| Modified Palm Kernel Oil | 0.71 |
| Monoglycerides | 0.41 |

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process for preparing an aerated food product that maintains good taste, texture and density, the process comprising the steps of:
   a) preparing a liquid carbohydrate blend comprising saccharide and fiber, the preparing comprising mixing and heating liquid and solid carbohydrates in a mixer at a temperature that dissolves the solid carbohydrate but does not boil the mixture and does not concentrate the liquid carbohydrate blend;
   b) preparing a hydrocolloid blend comprising hydrating hydrocolloid and a carbohydrate in a separated high shear mixer;
   c) mixing the carbohydrate blend of a) with the heated hydrated hydrocolloid blend of b) in a mixer to form a homogenous blend;
   d) adding to the homogenous blend of c), a dry food product comprising fiber, about 4-45% protein that has not been treated with fat and about 1-5% of a whipping agent and mixing, in a double arm mixer, the homogenous blend and dry food product for about 1 minute at about 60 RPM to form a dough that has a density of 1.00 g/cc to 1.1 g/cc;
   e) aerating the dough in double arm mixer for about 5 to 15 minutes at about 120 RPM to obtain a semi-moist, non-sticky aerated food product having a density of 0.4 g/cc to 0.9 g/cc, wherein no gas or chemical for gassing is added during the aeration process; and wherein optionally fiber is added after aeration;
   f) optionally, adding flavors and fat to the aerated food product; and
   g) shaping the aerated food product without the need for further cooling, drying or setting;
   wherein the aerated food product comprises from about 50 to 80% carbohydrate of which about 4% to 70% of the carbohydrate is fiber.

2. The process of claim 1, wherein in step a), the liquid blend is heated to a temperature of about 75° to 105° C.

3. The process of claim 1, wherein the carbohydrate of step a) is selected from the group consisting of sugar, fructose, dextrose, polydextrose, honey, maple syrup, hickory syrup, sugar beet syrup, cane syrup, molasses, brown rice syrup, agave syrup, yacon syrup, stevia syrup or powder, high fructose corn syrups, high maltose corn syrups, corn syrup 42 DE, corn syrup 62 DE, Inverted Syrups, Glycerin, Sorbitol Syrup, Crystal Maltitol, Maltitol Syrup, Isomalt, Xylitol, lactitol, erythritol, manitol, fructo-oligosacharide, oligofructose, maltodextrin, cellulose gel, fruit fiber, corn dextrin, wheat dextrin, sugar beet fiber, psyllium, citrus fiber, vegetable fiber, apple pectin, xanthan gum fiber, arabic gum fiber and combinations thereof.

4. The process of claim 1, wherein the hydrocolloid is selected from the group consisting of arabic, tragacanth, karaya, ghatti, agar, alginate, carrageenan, locust bean gum, psyllium, quince, tamarind, corn hull gum, pectin, arabinogalactan, dexran, xanthan, curdlan and mixtures thereof.

5. The process of claim 1, wherein protein of the dry food product of step d) is selected from the group consisting of whey, gelatin, soy, milk protein, egg, vegetable protein and combinations thereof.

6. The process of claim 1, wherein the whipping agent in the dry food product of step d) further comprises a whipping aid.

7. The process of claim 1, wherein the whipping agent is selected from the group consisting of egg albumen, soy protein enzyme modified and mixtures thereof.

8. The process of claim 6 wherein the whipping aid is a lactate of sodium, potassium or calcium.

9. The process of claim 1, wherein in step f) flavor is mixed with the aerated dough for 15-30 seconds at 15 to 60 RPM.

10. The process of claim 1, wherein in step f) fat is mixed with the aerated dough for 15-75 seconds at 15-60 RPM.

11. The process of claim 1, wherein in step a) a mixture of glycerin and corn syrup 62 DE are mixed with salt, maltodextrin 150, inulin, fructose and sugar at about 80 to 82 degrees centigrade; wherein in step b) pectin, water, sodium citrate and sugar are mixed together and heated to about 100 degrees centigrade and then cooled to about 85 degrees centigrade; wherein in step d) whey protein isolate hydrolyzed, whey protein concentrate, soy protein isolate, soy protein enzyme modified and inulin are added and mixed with the blend of step c) for about 50 seconds at 60 RPM; and wherein in step e) color is added to the dough and then the dough and color are whipped for about 8 to 12 minutes at 120 RPM and wherein in step f) inulin, peanut flour and flavors are added to the whipped dough.

12. The process of claim 1, wherein in step a) a mixture of glycerin, water, potassium lactate, invert syrup and corn syrup 62 DE are mixed with fructose at about 75 to 80 degrees centigrade; wherein in step b) pectin, fructose and water are mixed together and heated to about 100 degrees centigrade and then cooled to about 85 degrees centigrade; wherein in step d), whey protein isolate, calcium caseinate, tartaric acid, salt and cocoa are added and mixed with the blend of step c) for about 50 seconds at 60 RPM; and wherein in step e), the dough is whipped for about 8 to 12 minutes at 120 RPM; and wherein in step f) flavors are added to the whipped dough.

13. The process of claim 1, wherein in step a) a mixture of glycerin, water, potassium lactate, invert syrup and corn syrup 62 DE are mixed with fructose at about 75 to 80 degrees centigrade; wherein in step b) fructose, carrageenan and water are mixed together and heated and maintained at 85 degrees centigrade; wherein in step d), soy protein enzyme modified, oat fiber, inulin, cellulose gel, maltodextrin fiber, salt and titanium dioxide are added and mixed with the blend of step c) for about 50 seconds at 60 RPM; and wherein in step e) the dough is whipped for about 8 to 12 minutes at 120 RPM; and wherein in step f) melted fractionated palm oil mixed into the whipped dough for 10 to 15 seconds at about 15 to 60 RPM; and wherein in step g) the dough is immediately slabbed into a layer.

14. The process of claim 1, wherein in step a) hydrated fructooligosaccharide, crystalline fructose and glycerine are blended; wherein in step b) water, alginate and crystalline fructose are blended; wherein in step d) a homogenous blend of a) and b) is mixed with whey protein, casein calcium, dried egg albumin, gelatin, corn dextrin, crystalline sorbitol powder, salt, chocolate flavor, instant coffee gold cup tartaric acid, ethyl vanillin flavor, a vitamin blend and encapsulated magnesium oxide 40% to form a dough; and wherein in step e) the dough of d) is whipped.

* * * * *